G. FETTER.
Car-Starters.

No. 139,134.

Patented May 20, 1873.

UNITED STATES PATENT OFFICE.

GEORGE FETTER, OF PHILADELPHIA, PENNSYLVANIA.

IMPROVEMENT IN CAR-STARTERS.

Specification forming part of Letters Patent No. 139,134, dated May 20, 1873; application filed December 20, 1872.

*To all whom it may concern:*

Figure 1:
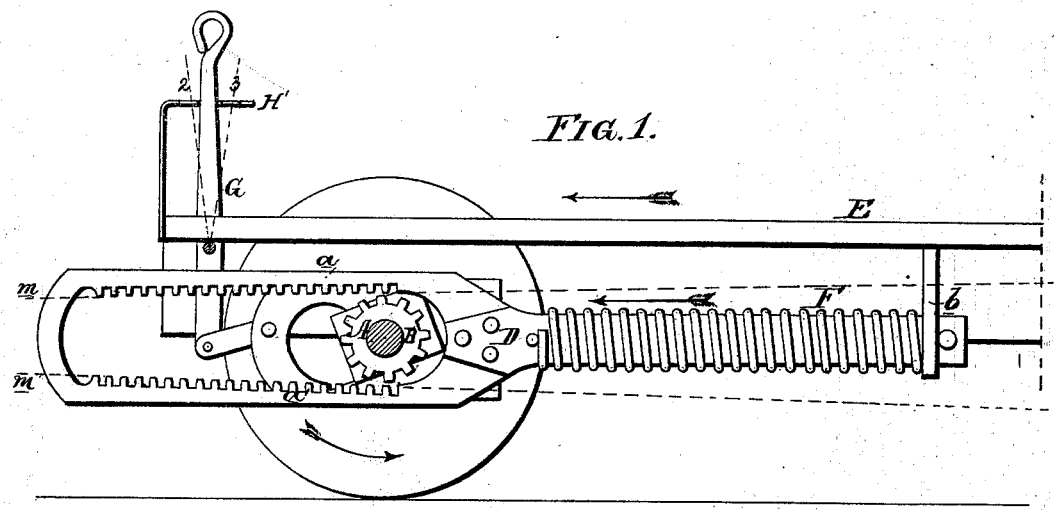

Be it known that I, GEORGE FETTER, of Philadelphia, Pennsylvania, have invented Mechanism for Stopping and Starting Street-Cars, of which the following is a specification:

The object of my invention is to aid the horses attached to street-cars in starting and stopping the same; and this object I attain by a bar, D, acted on by a spring, and having converging racks, either or both of which may be brought into gear with a pinion, B, on the axle A, as shown in the side view, Figure 1, of the accompanying drawing, so that the power, or a portion of the power, exerted to stop the car, may be absorbed by the spring and retained by the same until it is required to aid the horses in starting the car, these desired results being attained by the raising and lowering of the bar D, which can yield with the axle without detracting from the efficacy of the mechanism for operating the car, all of which is fully described hereafter. To one of the axles A of the car is secured a pinion, B, having teeth adapted to those of racks $a$ and $a'$ formed on the bar D, situated beneath the frame E of the car, and arranged to slide at its rear end in a guide, $b$, a substantial spring, F, tending to force the bar in the direction of the arrow, Fig. 1. The front end of the bar can be raised and lowered by means of a lever, G, through the medium of mechanism, particularly described hereafter. The lever G can be adjusted to and retained by a notched guard, H, or its equivalent, in three different positions. When the lever is in the position shown in Fig. 1, the pinion is out of gear with both racks; hence, the axle can revolve freely without disturbing the bar D; but should it be desirable to stop the car when it is moving in the direction of the arrow, the driver moves the lever G to the position 2, and thereby raises the bar so that its lower rack $a'$ shall be in gear with the pinion, when the movement of the car must necessarily force the bar D rearward and compress the spring E, the rigidity of the latter increasing as the pressure is continued, thereby gradually retarding and finally stopping the car. In other words, the car is caused to stop itself by a braking action, precisely analogous to that of an ordinary brake gradually applied through an elastic medium. The moment the car has been stopped it is important that the bar D should be arrested in the position it has been moved, otherwise the recoil of the spring would induce the rearward movement of the car. In order to prevent this premature recoil of the spring, the racks are arranged to converge, as shown by the dotted lines $m\ m$, the space between the racks at the front end of the bar being thus made so narrow that when the bar D has been moved rearward in the manner described, and when the lever G is moved to its first central position, both racks will be partially in gear with the pinion; and consequently the bar D will be locked until it is necessary to again start the car, when the driver moves the lever G to the position 3 and brings the upper rack wholly into gear with the pinion, and withdraws the lower rack from the latter, when the recoil of the spring will force the bar forward and cause the pinion, and consequently the axle and wheels, to turn in the direction of the arrow, thereby aiding the horses to start the car. Before the recoil of the spring is expended, however, the driver again moves the lever to the first position, when both racks will be clear of the pinion, and the axle and wheels at liberty to revolve without disturbing the bar D.

It may be here remarked, that if the horses are attached to the opposite end of the car so that the latter has to move in a direction contrary to that pointed out by the arrow, the conductor, on taking charge of the lever, can control the mechanism with results precisely similar to those described above, a slight difference, readily understood without explanation being demanded, in the manipulation of the lever.

Figure 2:
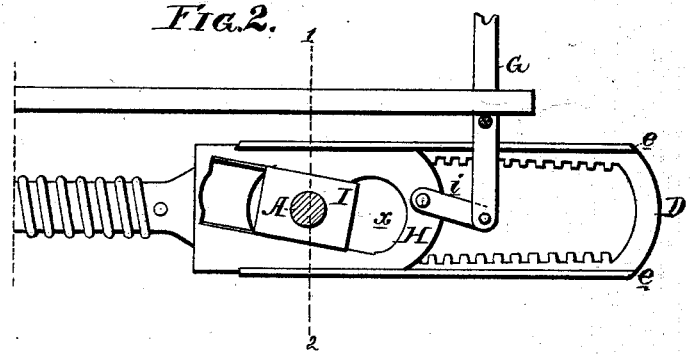
Figure 3:
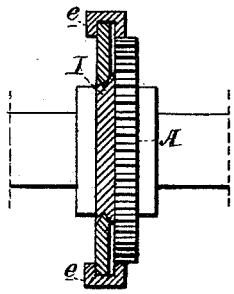

The mechanism, through the medium of which the lever G is caused to raise and lower the bar D, may be varied; but as it is important that the devices described should in no case be affected by the yielding of the springs between the body of the car and the axle-boxes, I prefer the mechanism illustrated in the side view, Fig. 2, which is the reverse of that shown in Fig. 1, and in the transverse section, Fig. 3, on the line 1 2.

At the upper and lower edges of the bar are formed guides $e\ e$ adapted to the sliding-plate H, which is connected to the lower end of the lever G by a link, $i$, and in which is an inclined slot, $x$, adapted to a plate, I, the axle A passing through and revolving freely in the said plate I. On moving the sliding plate H to and fro by means of the lever G, the bar D will be raised and lowered, and, owing to the presence of the link $i$, the bar and its slides will yield with the axle without affecting the proper control by the lever G of the bar D.

I claim as my invention—

1. The converging racks $m$ $m$ forming a permanent part of the spring-bar D and supported by the axle, in combination with a pinion, B, on the said axle; the whole being applied to a street-car, substantially as and for the purpose herein set forth.

2. The bar D and the slide H connected to an operating-lever, G, by a link, $i$, and having an inclined slot, $x$, adapted to a plate, I, embracing the axle A.

In testimony whereof I have signed my name to this specification in the presence of two subscribing witnesses.

GEORGE FETTER.

Witnesses:
WM. A. STEEL,
HUBERT HOWSON.